US012197165B2

(12) United States Patent
Ishida

(10) Patent No.: US 12,197,165 B2
(45) Date of Patent: Jan. 14, 2025

(54) IMAGE FORMING APPARATUS

(71) Applicant: KYOCERA Document Solutions Inc., Osaka (JP)

(72) Inventor: Hirotaka Ishida, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/333,194

(22) Filed: Jun. 12, 2023

(65) Prior Publication Data

US 2023/0408968 A1 Dec. 21, 2023

(30) Foreign Application Priority Data

Jun. 17, 2022 (JP) ................................ 2022-098305

(51) Int. Cl.
*G03G 21/16* (2006.01)

(52) U.S. Cl.
CPC ..... *G03G 21/1647* (2013.01); *G03G 21/1676* (2013.01)

(58) Field of Classification Search
CPC ....... G03G 21/1647; G03G 2221/1657; G03G 21/186; G03G 15/0121; G03G 2215/0177; G03G 21/1676; G03G 21/1825
See application file for complete search history.

(56) References Cited

U.S. PATENT DOCUMENTS

| | | | | |
|---|---|---|---|---|
| 2015/0093146 | A1 | 4/2015 | Sato et al. | 399/111 |
| 2015/0098728 | A1* | 4/2015 | Hayakawa | G03G 15/757 399/167 |
| 2016/0291540 | A1 | 10/2016 | Sato et al. | G03G 21/1857 |
| 2017/0176923 | A1* | 6/2017 | Kim | G03G 21/1647 |
| 2018/0017936 | A1 | 1/2018 | Sato et al. | G03G 21/1857 |
| 2018/0373199 | A1* | 12/2018 | Sugimoto | G03G 21/1825 |
| 2019/0146410 | A1 | 5/2019 | Sato et al. | G03G 21/1857 |
| 2019/0235410 | A1* | 8/2019 | Nakazawa | G03G 15/0121 |
| 2020/0125029 | A1 | 4/2020 | Sato et al. | G03G 21/1857 |
| 2021/0011395 | A1* | 1/2021 | Itabashi | G03G 15/0896 |
| 2021/0191314 | A1 | 6/2021 | Sato et al. | G03G 21/1857 |
| 2022/0350292 | A1 | 11/2022 | Sato et al. | G03G 21/1587 |

FOREIGN PATENT DOCUMENTS

| | | |
|---|---|---|
| JP | 2014-016610 A | 1/2014 |

* cited by examiner

*Primary Examiner* — Jessica L Eley
(74) *Attorney, Agent, or Firm* — Stein IP, LLC

(57) ABSTRACT

The image forming apparatus includes: an image carrier, a developing unit, a moving mechanism, and a drive input gear. The developing unit, including a development container and a developer carrier, is supported so as to be swingable among a contact position, a first separate position, and a second separate position. The moving mechanism reciprocates the developing unit between the contact position and the second separate position. The drive input gear inputs, to the developing unit, driving force for driving rotation of the developer carrier. While the developing unit is in the contact position or the first separate position, the drive transmission gear is engaged with the drive input gear. While the developing unit is being moved from the first separate position to the second separate position, the drive transmission gear is separated from the drive input gear.

4 Claims, 7 Drawing Sheets

IMAGE FORMING APPARATUS

INCORPORATION BY REFERENCE

This application is based on and claims the benefit of priority from Japanese Patent Application No. 2022-098305 filed on Jun. 17, 2022, the contents of which are hereby incorporated by reference.

BACKGROUND

An image forming apparatus (copiers, printers, facsimiles, as well as their multifunction peripherals, etc.) which adopts an electrophotographic system performs development of an electrostatic latent image formed on an outer circumferential surface of an image carrier (i.e., formation of a toner image elicited from an electrostatic latent image).

Such an image forming apparatus includes an image carrier and a developing unit. The developing unit includes a development container and a developer carrier. The development container has toner-containing developer housed inside thereof. The developer carrier is rotatably supported by the development container. The developer carrier is placed in opposition to the image carrier. In a case where the image forming apparatus adopts a contact development method, toner is supplied from the developer carrier to the image carrier while an outer circumferential surface of the developer carrier and the image carrier keep in contact with each other.

The image forming apparatus, as in this case, is in general designed to keep the developer carrier from rotating, for prevention of deterioration of the developer, during periods in which image formation is suppressed (e.g., while the developing unit is under drum cleaning or while the developing unit for use of color development is in a monochromatic printing mode). However, in the above-described image forming apparatus adopting the contact development method, when the developer carrier is stopped from rotating while the image carrier keeps rotating, the developer carrier and the image carrier may rub against each other. Then, there arises a fear that the developer carrier and the image carrier may be worn, causing image deficiencies.

With regard to such a problem, there has been provided a developing unit which adopts a process cartridge system and further adopts a configuration having a drive transmission mechanism and a moving mechanism provided inside the cartridge. The developer carrier of this developing unit is so held as to be movable between a position involving contact with the image carrier and another position involving separation therefrom. The drive transmission mechanism, which is a gear train formed of plural gears, transmits driving force, which is inputted to the image carrier, to the developer carrier.

More concretely, the drive transmission mechanism is made up by including a drive input gear for inputting driving force to the image carrier, and a drive transmission gear for inputting driving force to the developer carrier. The drive input gear is connected to a driving source of the image forming apparatus, and inputs driving force of the driving source to the image carrier. The drive transmission gear is connected to the developer carrier and supported so as to be engageable with and separable from the drive input gear. The developer carrier and the drive transmission gear are coupled to each other so as to be integrally movable. With the developer carrier in contact with the image carrier, the drive transmission gear and the drive input gear are engaged with each other.

The moving mechanism makes the developer carrier separated from the image carrier. Since the drive transmission gear moves integrally with the developer carrier, separation of the developer carrier from the image carrier by the moving mechanism causes the drive transmission gear to be separated from the drive input gear. As a result, since separation of the developer carrier from the image carrier by the moving mechanism causes the developer carrier to be simultaneously stopped from rotating, it becomes possible to suppress wear of the developer carrier and the image carrier as described above.

SUMMARY

An image forming apparatus according to one aspect of the present disclosure includes an image carrier, a developing unit, a moving mechanism, and a drive input gear. The image carrier, in which an electrostatic latent image is to be formed on its outer circumferential surface, is rotatably supported. The developing unit includes: a development container for internally containing a toner-containing developer; and a developer carrier which is rotatably supported by the development container and which carries the developer, the developing unit being supported so as to be swingable among: a contact position in which an outer circumferential surface of the developer carrier is in contact with the outer circumferential surface of the image carrier, allowing the toner to be fed to the outer circumferential surface of the image carrier; a first separate position in which the developer carrier is separate from the image carrier; and a second separate position in which the developer carrier is separate from the image carrier farther than in the first separate position. The moving mechanism reciprocates the developing unit between the contact position and the second separate position. The drive input gear inputs, to the developing unit, driving force for driving rotation of the developer carrier. The developing unit includes a drive transmission gear for transmitting the driving force of the drive input gear to the developer carrier. While the developing unit is in the contact position or the first separate position, the drive transmission gear is engaged with the drive input gear. While the developing unit is being moved from the first separate position to the second separate position, the drive transmission gear is separated from the drive input gear.

DETAILED DESCRIPTION

Figure 1:
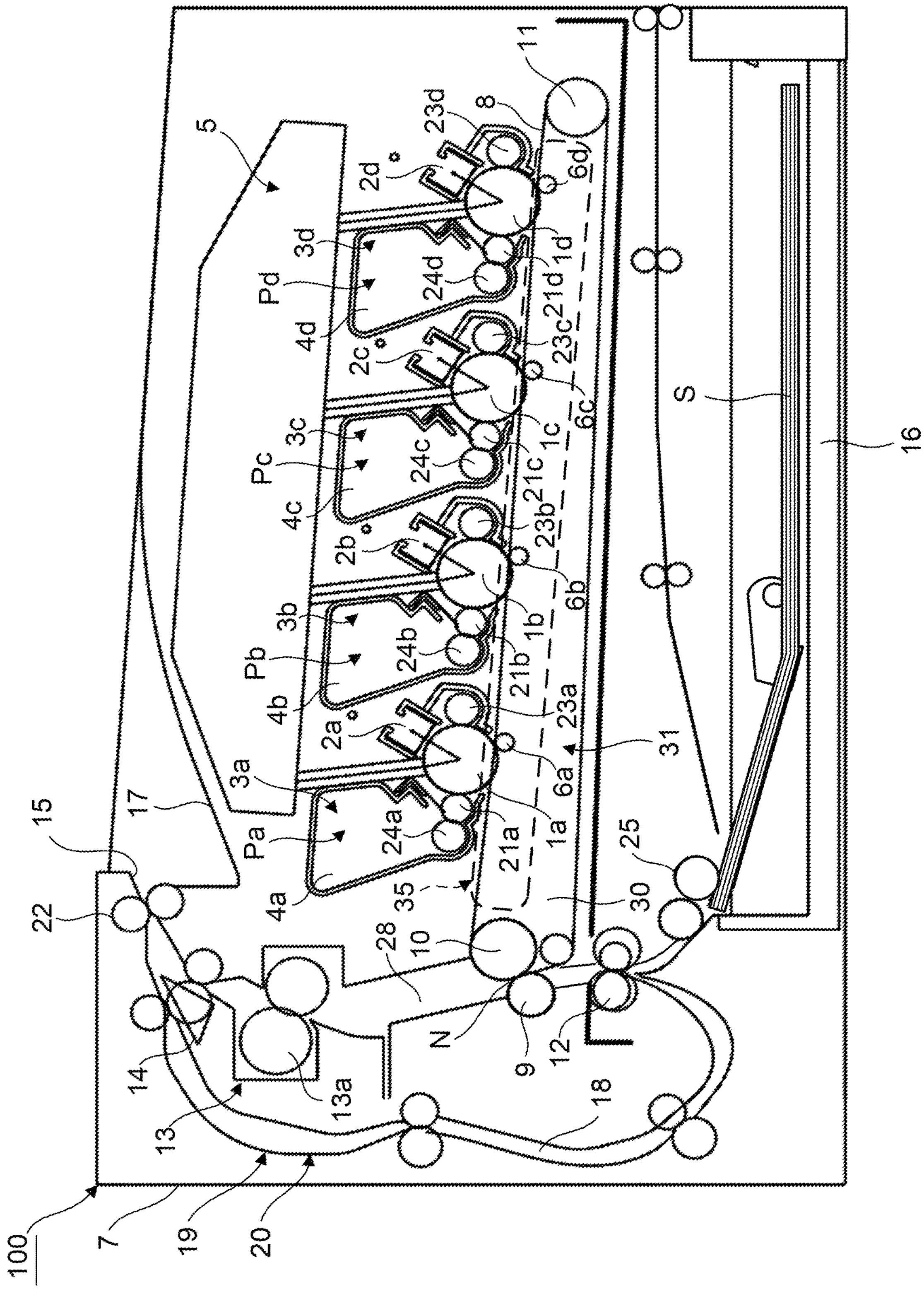
FIG. 1 is a schematic sectional view of an image forming apparatus according to an embodiment of the present disclosure.

Hereinbelow, an embodiment of the present disclosure will be described with reference to the accompanying drawings. FIG. 1 is a schematic sectional view of an image forming apparatus 100 according to the embodiment of the disclosure. The image forming apparatus 100 shown in FIG. 1 is a color printer of the so-called tandem type.

Inside a main body of the image forming apparatus 100 (hereinafter, referred to as apparatus body 7), image forming parts Pa-Pd are provided in a horizontal array. The image forming parts Pa-Pd sequentially form images of magenta, cyan, yellow and black, respectively, through steps of charging, exposure, development and transfer. The image forming parts Pa-Pd are provided in correspondence to images of those respective colors. Whereas the following description addresses the image forming part Pa only, the case is basically the same also with the image forming parts Pb-Pd, which will be omitted in description.

A photosensitive drum 1*a* (image carrier) for carrying a visible image (toner image) is provided in the image forming part Pa. An exposure unit 5 is placed above the image forming part Pa. The exposure unit 5 emits optical beams toward surfaces of photosensitive drums 1*a*-1*d* to draw electrostatic latent images thereon. A charging unit 2*a*, a developing unit 3*a* and a sliding roller 23*a* are placed along a drum-rotational direction (clockwise direction in FIG. 1) around the photosensitive drum 1*a*. The charging unit 2*a* is placed in opposition to the photosensitive drum 1*a* and enabled to electrically charge the surface of the photosensitive drum 1*a*.

The developing unit 3*a* includes a development container 4*a*, a developing roller 21*a* (developer carrier), and a feed roller 24*a*. The development container 4*a* has a specified quantity of toner contained therein. Toner of magenta, cyan, yellow and black, assigned to the developing units 3*a*-3*d*, is contained in the development containers 4*a*-4*d*, respectively.

The developing roller 21*a* is placed in opposition to the photosensitive drum 1*a*. The feed roller 24*a* feeds toner contained in the development container 4*a* onto an outer circumferential surface of the developing roller 21*a*. The developing roller 21*a* is enabled to feed the photosensitive drum 1*a* with the toner fed onto the outer circumferential surface. The developing units 3*a*-3*d* will be detailed later.

An intermediate transfer unit 31 is provided under the photosensitive drums 1*a*-1*d*. The intermediate transfer unit 31 includes a frame 30, a driving roller 10, a tension roller 11, an intermediate transfer belt 8, and primary transfer rollers 6*a*-6*d*.

The frame 30 extends along a widthwise direction (leftward/rightward direction in FIG. 1) of the image forming apparatus 100. The driving roller 10 and the tension roller 11 are rotatably supported at longitudinal both ends of the frame 30.

The intermediate transfer belt 8 is an endless belt (preferably, a seamless belt). The intermediate transfer belt 8 is wound and stretched from the tension roller 11 to the driving roller 10 so as to be circumferentially turnable.

The driving roller 10 is connected to a belt driving motor (not shown). When the driving roller 10 is rotated by rotation driving force of the belt driving motor, the rotation driving force is transmitted to the intermediate transfer belt 8 by frictional force. As a result, the intermediate transfer belt 8 is turned in the same direction as a rotational direction of the driving roller 10.

The primary transfer rollers 6*a*-6*d* are rotatably and movably supported by the frame 30 at positions opposed to the photosensitive drums 1*a*-1*d*, respectively, with the intermediate transfer belt 8 interposed therebetween.

A secondary transfer roller 9 is provided in opposition to the driving roller 10 with the intermediate transfer belt 8 interposed therebetween. The secondary transfer roller 9 is put into pressure contact with the intermediate transfer belt 8 to form a secondary transfer nip N. The secondary transfer roller 9 secondarily transfers a toner image, which has been formed on the intermediate transfer belt 8, onto a sheet S passing through the secondary transfer nip N.

A sheet cassette 16 is provided in lower part of the apparatus body 7. The sheet cassette 16 is removably set inside the apparatus body 7 sideways of the apparatus body 7. The sheet cassette 16 is capable of stacking sheets S thereon.

A sheet conveyance path 20 is provided inside the apparatus body 7. The sheet conveyance path 20 includes a main conveyance path 28, and a double-sided conveyance path 18. The main conveyance path 28 is connected to the sheet cassette 16. Placed at one or other positions on the main conveyance path 28 are a registration roller pair 12, the secondary transfer roller 9, and a fixing unit 13. The main conveyance path 28 conveys a sheet S in such a way that the sheet S passes from the sheet cassette 16 through the registration roller pair 12, the secondary transfer nip N, and the fixing unit 13 in this order.

The registration roller pair 12 aligns conveyance direction of the sheet S so that a fore end (downstream-side end portion in the sheet conveyance direction) of the sheet S becomes perpendicular to the sheet conveyance direction, thereby correcting any skew of the conveyance.

A sheet feed part 25 is provided on an upstream side of the registration roller pair 12 in the sheet conveyance direction. The sheet feed part 25 feeds each of the sheets S, which are stacked on the sheet cassette 16, to the main conveyance path 28.

A sheet discharge port 15 communicating with external of the image forming apparatus 100 is provided at a downstream-side end portion of the main conveyance path 28 in the sheet conveyance direction. A discharge roller pair 22 is provided at the sheet discharge port 15. The discharge roller pair 22 discharges the sheet S, which has arrived at the sheet discharge port 15, onto a discharge tray 17 formed on a main-body upper surface of the image forming apparatus 100.

A branch portion 14 is provided between the discharge roller pair 22 and the fixing unit 13 in the sheet conveyance direction. The double-sided conveyance path 18 branches from the main conveyance path 28 at a position of the main conveyance path 28 overlapping with the branch portion 14 in the sheet conveyance direction. Then, the double-sided conveyance path 18 merges again with the main conveyance path 28 at a position upstream of the registration roller pair 12 in the main conveyance path 28. The branch portion 14 is enabled to assortatively direct a sheet S, which has passed through the fixing unit 13, toward either the sheet discharge port 15 or the double-sided conveyance path 18.

Next, a procedure of image formation in the image forming apparatus 100 is described. Upon a user's input of an instruction for starting image formation, firstly with the photosensitive drum 1*a* being rotated, surfaces of the photosensitive drums 1*a*-1*d* are uniformly electrically charged by charging units 2a-2d, respectively. Subsequently, the surfaces of the photosensitive drums 1a-1d are subjected to photoirradiation by the exposure unit 5, by which electrostatic latent images corresponding to image signals are formed on the photosensitive drums 1a-1d, respectively.

Then, toner in the developer of the developing units 3a-3d is fed to and electrostatically deposited on the photosensitive drums 1a-1d by the developing rollers 21a-21d, respectively. As a result, toner images corresponding to the electrostatic latent images are formed on the photosensitive drums 1a-1d.

In this state, the driving roller 10 is rotated to make the intermediate transfer belt 8 started to rotate counterclockwise. Then, the toner images of individual colors formed on the photosensitive drums 1a-1d are primarily transferred sequentially onto the intermediate transfer belt 8.

Thereafter, at a specified timing, a sheet S is fed from the sheet cassette 16 to the main conveyance path 28 and, after passing through the registration roller pair 12, is conveyed to the secondary transfer nip N. Then, the toner images on the intermediate transfer belt 8 are secondarily transferred onto the sheet S. Further, the sheet S is conveyed to the fixing unit 13 and heated and pressured by a fixing roller pair 13a of the fixing unit 13, by which the toner images are fixed onto the surface of the sheet S.

Under this situation, when the sheet S is subjected to one-sided printing, the branch portion 14 assortatively directs the sheet S, which has passed through the fixing unit 13, toward the sheet discharge port 15. The sheet S having arrived at the sheet discharge port 15 is discharged onto the discharge tray 17 by the discharge roller pair 22.

When the sheet S is subjected to double-sided printing, the branch portion 14 assortatively directs the sheet S, which has passed through the fixing unit 13, toward the double-sided conveyance path 18. The double-sided conveyance path 18, while carrying out front-and-back reversal of the sheet S, conveys the sheet S once again to the registration roller pair 12. Then, the sheet S passes again through the secondary transfer nip N and the fixing unit 13, with the toner images fixed on the back of the sheet S. Thereafter, the sheet S is assortatively directed toward the sheet discharge port 15 by the branch portion 14.

Figure 2:
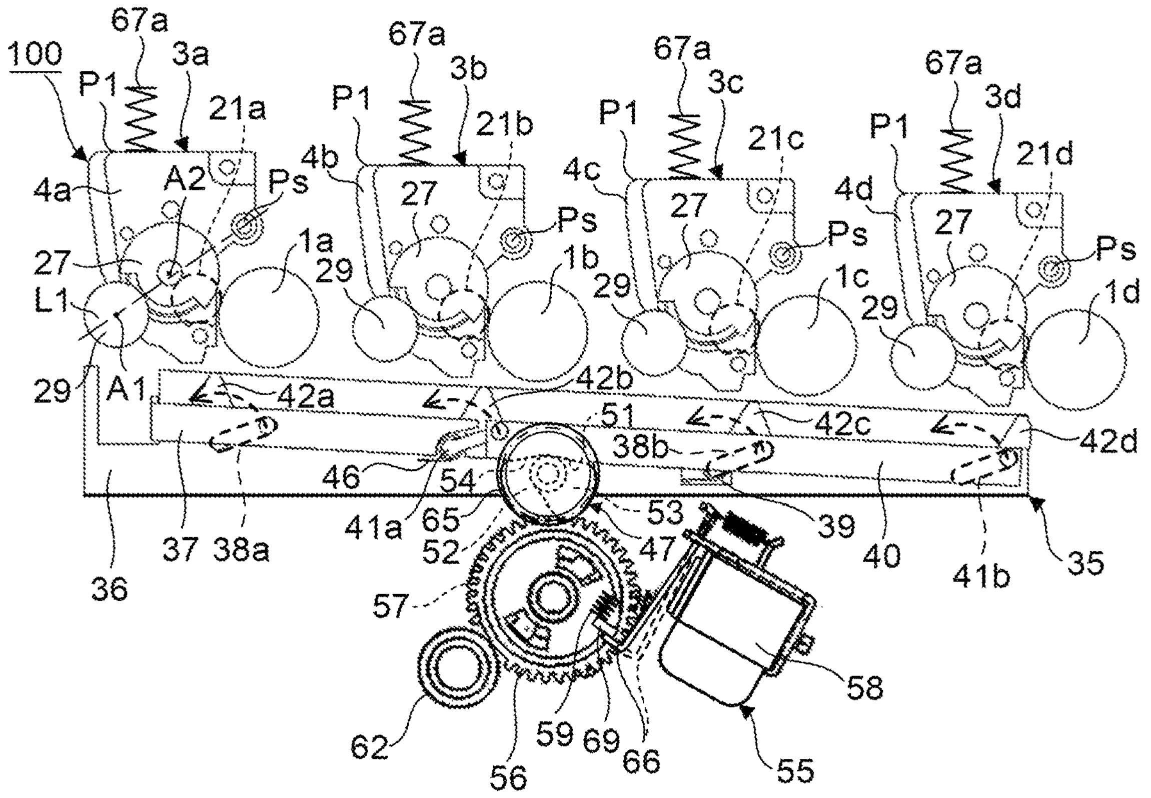
FIG. 2 is a side view of around individual developing units as viewed sideways.
Figure 3:
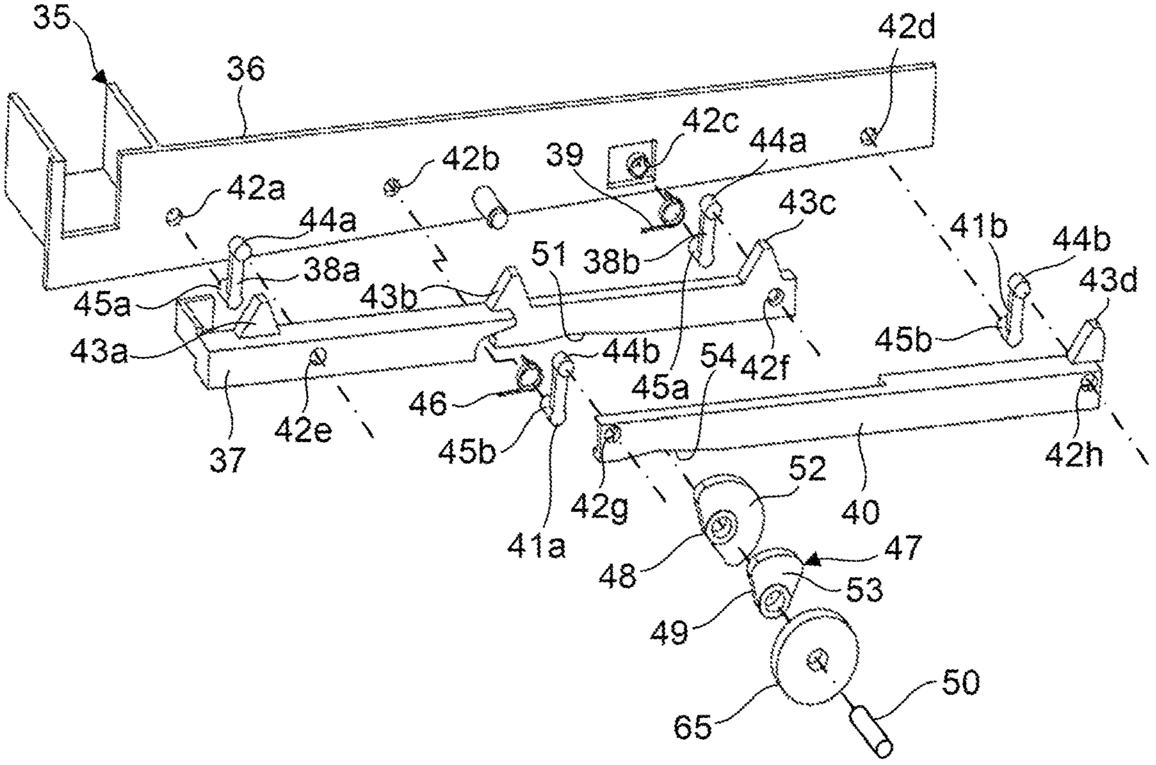
FIG. 3 is a perspective view showing component elements of a moving mechanism in an exploded state.

Next, a moving mechanism 35 is described in detail. FIG. 2 is a side view of around the developing units 3a-3d as viewed sideways. FIG. 3 is a perspective view showing component elements of the moving mechanism 35 in an exploded state. As shown in FIGS. 1 and 2, the image forming apparatus 100 includes, in addition to the above-described components, the moving mechanism 35 and swinging-and-biasing members 67a, 67b (biasing members). The moving mechanism 35 makes the developing units 3a-3d reciprocatively moved between a contact position P1 and a second separate position P3 (see FIG. 7) in a swinging direction. Swings of the developing units 3a-3d will be detailed later.

As shown in FIGS. 2 and 3, the moving mechanism 35 is made up by including a base member 36, a first link member 37, first pivoting arms 38a, 38b, a second link member 40, second pivoting arms 41a, 41b, a first biasing member 39, a second biasing member 46, a drive mechanism 55, a cam mechanism 47, and a third biasing member 59.

The base member 36 is placed under the developing units 3a-3d. The base member 36 is a platy member formed slender in a direction in which the developing units 3a-3d are arrayed (horizontal direction in this case). In the base member 36, pin holes 42a-42d are formed so as to be arrayed at equal intervals along an array direction of the developing units 3a-3d.

The first link member 37 is a bar-like member formed slender in the array direction of the developing units 3a-3d. The first link member 37 is placed under the developing units 3a-3d. The first link member 37 is located so as to overlap with the base member 36 in the array direction of the developing units 3a-3d.

The first link member 37 has projective portions 43a-43c, as well as pin holes 42e, 42f formed therein. The projective portions 43a-43c are protrusions projecting from an upper surface of the first link member 37 toward the developing units 3a-3c, respectively. The projective portions 43a-43c are arrayed at equal intervals along a longitudinal direction of the first link member 37. The array interval of the projective portions 43a-43c is generally equal to the array interval of the developing units 3a-3c.

A first working recess portion 51 is formed in one longitudinally-extending side-end portion of the first link member 37, the one side-end portion being opposed to the other side-end portion on which the projective portions 43a-43c are provided. The first working recess portion 51 is a recess portion which is formed in a lower surface of the first link member 37 so as to be recessed upward. The first working recess portion 51 is positioned on one side of a longitudinal center of the first link member 37 closer to the projective portion 43c.

The pin hole 42e is a through hole formed at a longitudinal one-side near-end portion of the first link member 37. The pin hole 42f is a through hole formed at the longitudinal other-side near-end portion of the first link member 37.

As viewed in axial directions of the photosensitive drums 1a-1d (directions perpendicular to the array direction of the developing units 3a-3d; hereinafter, referred to simply as axial direction), the first pivoting arms 38a, 38b are placed between the base member 36 and the first link member 37. A link-side support pin 44a and a base-side support pin 45a are formed at longitudinal both ends, respectively, of each of the first pivoting arms 38a, 38b.

The link-side support pin 44a projects toward the first link member 37. The base-side support pin 45a projects toward the base member 36. The link-side support pin 44a of the first pivoting arm 38a is inserted into the pin hole 42e. The base-side support pin 45a of the first pivoting arm 38a is inserted into the pin hole 42a. The link-side support pin 44a of the first pivoting arm 38b is inserted into the pin hole 42f. The base-side support pin 45a of the first pivoting arm 38b is inserted into the pin hole 42c.

The first pivoting arms 38a, 38b are supported on the base member 36 so as to be pivotable along a circumferential direction of the base-side support pin 45a. The first link member 37 is swingably supported on the base member 36 by engagement between the link-side support pin 44a of the first pivoting arm 38a and the pin hole 42e as well as engagement between the link-side support pin 44a of the first pivoting arm 38b and the pin hole 42f.

The second link member 40 is a bar-like member formed slender in the array direction of the developing units 3a-3d. The second link member 40 is placed under the developing units 3a-3d. The second link member 40 is positioned so as to overlap with the base member 36 as viewed in the array direction of the developing units 3a-3d. The second link member 40 is opposed to the base member 36 with the first link member 37 interposed therebetween as viewed in the axial direction.

The second link member 40 has a projective portion 43*d*, as well as pin holes 42*g*, 42*h* formed therein. The projective portion 43*d* is positioned so as to overlap with the developing unit 3*d* as viewed in the array direction of the developing units 3*a*-3*d*. The projective portion 43*d* is a protrusion projecting from an upper surface of the second link member 40 toward the developing unit 3*d*.

A second working recess portion 54 is formed in one longitudinally-extending side-end portion of the second link member 40, the one side-end portion being opposed to the other side-end portion on which the projective portion 43*d* is provided. The second working recess portion 54 is a recess portion which is formed in a lower surface of the second link member 40 so as to be recessed upward. The second working recess portion 54 is positioned on one side of a longitudinal center of the second link member 40, the one side being opposed to the other side on which the projective portion 43*d* is provided (i.e., on the same side as the pin hole 42*g* is provided). The second working recess portion 54 is positioned so as to overlap with the first working recess portion 51 as viewed in the longitudinal direction of the second link member 40.

The pin hole 42*g* is a through hole formed at a longitudinal one-side near-end portion of the second link member 40 (on one side opposite to the other side on which the projective portion 43*d* is provided). The pin hole 42*h* is a through hole formed at the longitudinal other-side near-end portion of the second link member 40 (on the side on which the projective portion 43*d* is provided).

The second pivoting arm 41*a* is placed between the first link member 37 and the second link member 40 as viewed in the axial direction. The second pivoting arm 41*b* is placed between the base member 36 and the second link member 40 as viewed in the axial direction. Each of the second pivoting arms 41*a*, 41*b* has a link-side support pin 44*b* positioned at longitudinal one end of the second pivoting arm, and a base-side support pin 45*b* positioned at the other end of the second pivoting arm. The link-side support pin 44*b* projects toward the second link member 40. The base-side support pin 45*b* projects toward the base member 36.

The link-side support pin 44*b* of the second pivoting arm 41*a* is inserted into the pin hole 42*g*. The base-side support pin 45*b* of the second pivoting arm 41*a* is inserted into the pin hole 42*b*. The link-side support pin 44*b* of the second pivoting arm 41*b* is inserted into the pin hole 42*h*. The base-side support pin 45*b* of the second pivoting arm 41*b* is inserted into the pin hole 42*d*.

The second pivoting arms 41*a*, 41*b* are supported on the base member 36 so as to be pivotable along a circumferential direction of the base-side support pin 45*b*. The second link member 40 is swingably supported on the base member 36 by engagement between the link-side support pin 44*b* of the second pivoting arm 41*a* and the pin hole 42*g* as well as engagement between the link-side support pin 44*b* of the second pivoting arm 41*b* and the pin hole 42*h*.

The first biasing member 39 and the second biasing member 46 are torsion coil springs that are elastically deformable along the circumferential direction. The first biasing member 39 is externally fitted to the base-side support pin 45*a* of the first pivoting arm 38*a*. The first biasing member 39 biases the first link member 37 along the circumferential direction of the base-side support pin 45*a* with biasing momentum for making the first link member 37 farther from the developing units 3*a*-3*d*.

The second biasing member 46 is externally fitted to the base-side support pin 45*b* of the second pivoting arm 41*a*. The second biasing member 46 biases the second link member along the circumferential direction of the base-side support pin 45*b* with biasing momentum for making the second link member 40 farther from the developing units 3*a*-3*d*.

The cam mechanism 47 is made up by including a first cam member 48, a second cam member 49, a cam driving gear 65, and a shaft body 50. The shaft body 50, extending through the first cam member 48, the second cam member 49, and the cam driving gear 65, is coupled to these members integrally. The first cam member 48, the second cam member 49, and the cam driving gear 65 are integrally rotated in a circumferential direction of the shaft body 50.

The first cam member 48 and the second cam member 49 are plane cams having working angles different from each other. The first cam member 48 is positioned so as to overlap with the first link member 37 as viewed in the axial direction. The first cam member 48 is set into contact with an inner circumferential surface of the first working recess portion 51. The first cam member 48 has a first cam lobe 52 projecting in a radial direction of the shaft body 50.

The second cam member 49 is positioned so as to overlap with the second link member 40 as viewed in the axial direction. An outer circumferential surface of the second cam member 49 is set into contact with an inner circumferential surface of the second working recess portion 54. The second cam member 49 has a second cam lobe 53 projecting in the radial direction of the shaft body 50.

The working angle of the second cam member 49 (an angle between both end edges of the second cam lobe 53 as viewed in the circumferential direction of the shaft body 50) is smaller than the working angle of the first cam member 48 (an angle between both end edges of the first cam lobe 52 as viewed in the circumferential direction of the shaft body 50). A downstream-side end edge of the first cam lobe 52 and a downstream-side end edge of the second cam lobe 53 are positioned so as to overlap with each other as viewed in a rotational direction of the first cam member 48 and the second cam member 49 (a counterclockwise direction along the circumferential direction of the shaft body 50 as viewed in the drawings). As viewed in this rotational direction, an upstream-side end edge of the first cam lobe 52 is positioned upstream of an upstream-side end edge of the second cam lobe 53.

When the first cam member 48 is turned to a specified angle, the first cam lobe 52 comes into contact with the first working recess portion 51. In this state, when the first cam member 48 is further turned, the first cam lobe 52, while sliding in contact with the first working recess portion 51, pushes up the first link member 37 toward the developing units 3*a*-3*d*. Then, the first link member 37 is pivoted along the circumferential direction of the base-side support pin 45*a* against biasing force of the first biasing member 39. Furthermore, when the first cam member 48 is turned until the first cam lobe 52 is separated from the first working recess portion 51 in the circumferential direction of the shaft body 50, the first link member 37 is swung downward along the circumferential direction of the base-side support pin 45*b* by the biasing force of the first biasing member 39.

When the second cam member 49 is turned to a specified angle, the second cam lobe 53 comes into contact with the second working recess portion 54. In this state, when the second cam member 49 is further turned, the second cam lobe 53, while sliding in contact with the second working recess portion 54, pushes up the second link member 40 toward the developing units 3*a*-3*d*. Then, the second link member 40 is pivoted along the circumferential direction of the base-side support pin 45*b* against biasing force of the second biasing member 46. Furthermore, when the second cam member 49 is turned until the second cam lobe 53 is separated from the second working recess portion 54 in the circumferential direction of the shaft body 50, the second link member 40 is pivoted downward along the circumferential direction of the base-side support pin 45*b* by the biasing force of the second biasing member 46.

The cam driving gear 65 is coupled to the drive mechanism 55. The cam driving gear 65 is rotated on reception of driving force outputted by the drive mechanism 55.

Figure 4:
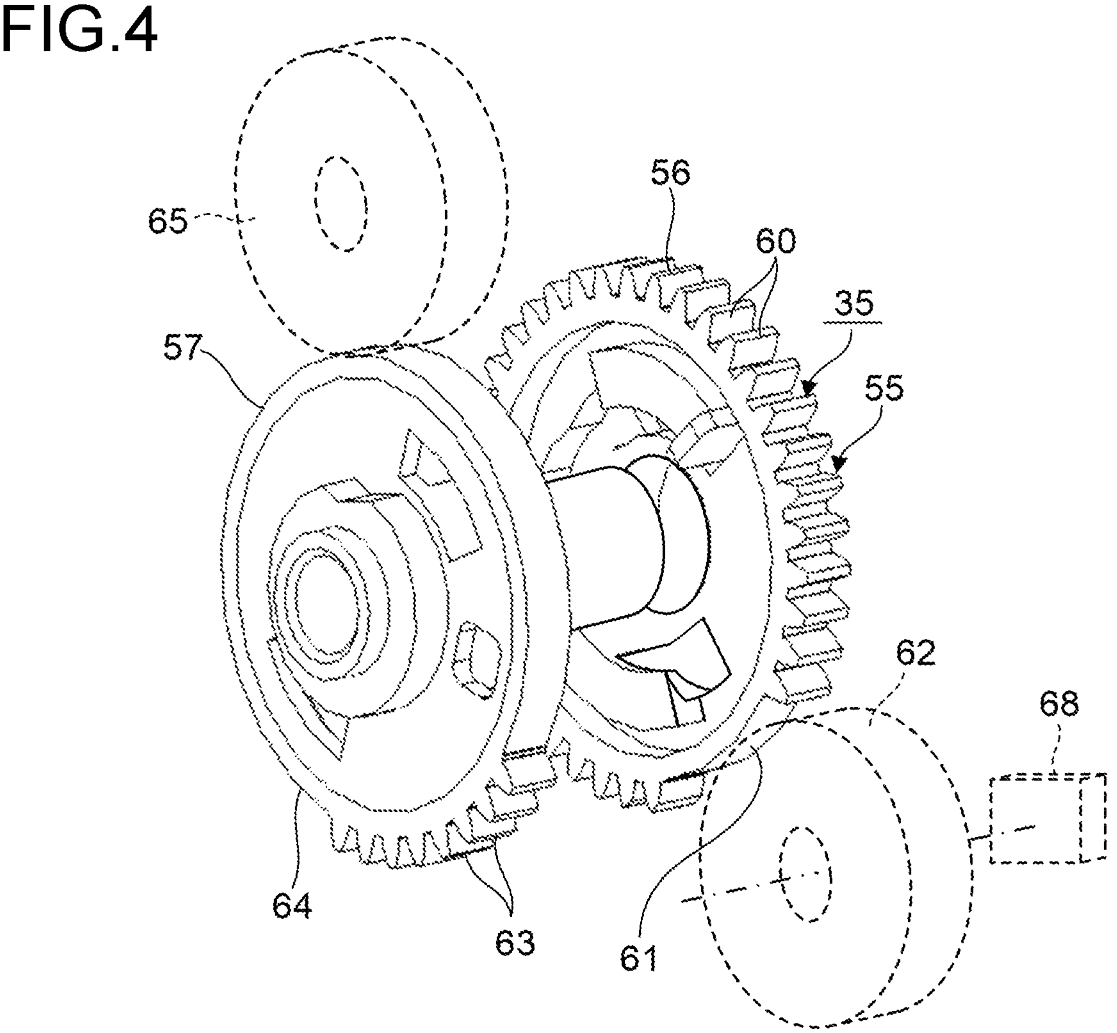
FIG. 4 is a perspective view showing a configuration of a drive mechanism.

FIG. 4 is a perspective view showing a configuration of the drive mechanism 55. As shown in FIGS. 2 and 4, the drive mechanism 55 includes a driving source 68, a first gear 56, a second gear 57, a link driving gear 62, a solenoid 58, and a third biasing member 59. The driving source 68 is a motor which outputs rotation driving force.

The first gear 56 and the second gear 57, which are juxtaposed to each other in the rotational-axis direction, are rotated integrally. The first gear 56 and the second gear 57 are intermittent gears. The first gear 56 has a plurality of gear teeth 60 and a first hiatus portion 61 formed on its outer circumferential surface. The gear teeth 60 are arrayed at equal intervals along a circumferential direction of the first gear 56. The first hiatus portion 61 is formed as if the gear teeth 60 were partly cut away along the circumferential direction of the first gear 56. In other words, no gear teeth 60 are formed in the first hiatus portion 61 of the outer circumferential surface of the first gear 56.

The link driving gear 62 is placed at a position radially opposed to the first gear 56. The link driving gear 62 is engageable with the first gear 56 via the gear teeth 60. While the first gear 56 is at a specified angle of rotation, the link driving gear 62 is positioned inside the first hiatus portion 61 and not engaged with the first gear 56.

The second gear 57 has a plurality of gear teeth 63 and a second hiatus portion 64 formed on its outer circumferential surface. The gear teeth 63 are arrayed at equal intervals along a circumferential direction of the second gear 57. The second hiatus portion 64 is formed as if the gear teeth 63 were partly cut away along the circumferential direction of the second gear 57. In other words, no gear teeth 63 are formed in the second hiatus portion 64 of the outer circumferential surface of the second gear 57.

The second gear 57 is placed so as to be radially opposed to the cam driving gear 65. The second gear 57 is engageable with the cam driving gear 65 via the plural gear teeth 63. While the second gear 57 is at a specified angle of rotation, the cam driving gear 65 is positioned inside the second hiatus portion 64 and not engaged with the second gear 57.

The solenoid 58 includes an iron core 66. The iron core 66 is supported so as to be reciprocatable by getting close to or separate from the first gear 56. While being close to the first gear 56, the iron core 66 is engaged with an engaging protrusion 69 formed in the first gear 56. The third biasing member 59 is in contact with the first gear 56. While the iron core 66 is engaged with the first gear 56, the third biasing member 59 biases the first gear 56 in the circumferential direction of the shaft body 50.

In this state, the first hiatus portion 61 and the link driving gear 62 are positioned so as to overlap with each other as viewed in the circumferential direction of the first gear 56. That is, the first gear 56 and the link driving gear 62 are not engaged with each other, and the first gear 56 is at a stop of rotation.

In this state, as the iron core 66 is separated from the first gear 56 so as to be released from engagement with the first gear 56, the first gear 56 is rotated to a specified angle by biasing force of the third biasing member 59. As a result, the first gear 56 and the link driving gear 62 are engaged with each other. Then, driving force of the driving source 68 is transmitted via the link driving gear 62 to the first gear 56, causing the first gear 56 to be rotated.

The second gear 57 is rotated integrally with the first gear 56. When the first gear 56 and the second gear 57 are rotated to a specified angle by the driving force of the driving source 68, the second gear 57 is engaged with the cam driving gear 65. Subsequently, the driving force of the driving source 68 is transmitted via the first gear 56 and the second gear 57 to the cam driving gear 65, causing the cam driving gear 65 to be rotated.

In this state, when the second gear 57 is rotated to such a specified angle that the second hiatus portion 64 overlaps with the cam driving gear 65 as viewed in the circumferential direction of the second gear 57, the engagement between the second gear 57 and the cam driving gear 65 is released. As a result, the cam driving gear 65 is stopped from rotation.

The iron core 66 gets close to the first gear 56 once again after the separation from the first gear 56. In this case, the engaging protrusion 69, which is rotated integrally with the first gear 56, is separate from the iron core 66. When the iron core 66 has made one-round rotation in the circumferential direction after the separation from the first gear 56, the iron core 66 and the engaging protrusion 69 are engaged with each other once again, so that the link driving gear 62 reaches such a position as to overlap with the first hiatus portion 61 as viewed in the circumferential direction of the first gear 56. Thus, the engagement between the first gear 56 and the link driving gear 62 is released, causing the first gear 56 to be stopped from rotation.

Next, the developing units 3*a*-3*d* and the moving mechanism 35 are described in detail. Since the developing units 3*a*-3*d* are common in configuration to one another, the following description is made chiefly on the developing unit 3*a* while only differences from the developing unit 3*a* are explained for the developing units 3*b*-3*d*.

Figure 5:
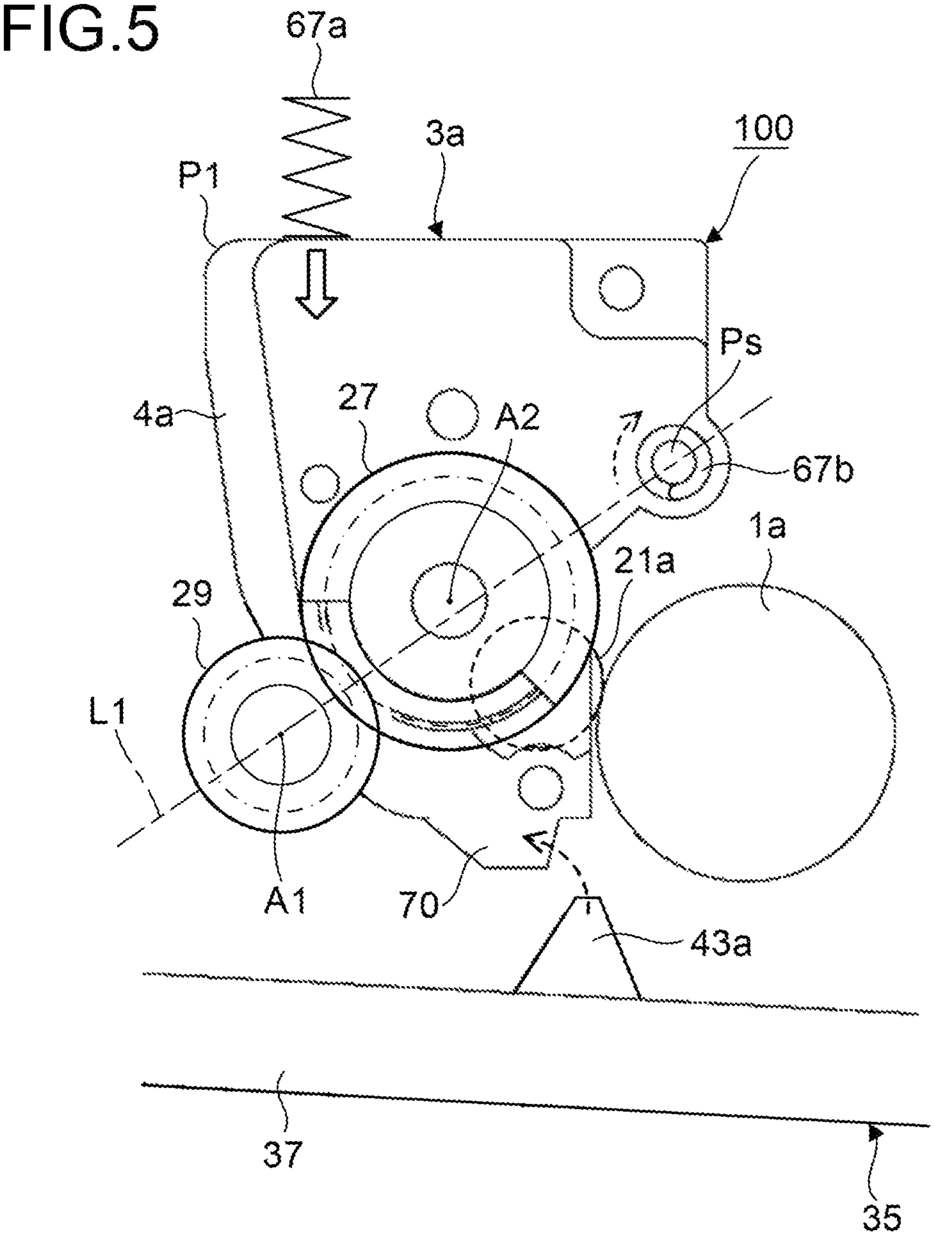
FIG. 5 is a side view of around one of the developing units positioned in a contact position.
Figure 6:
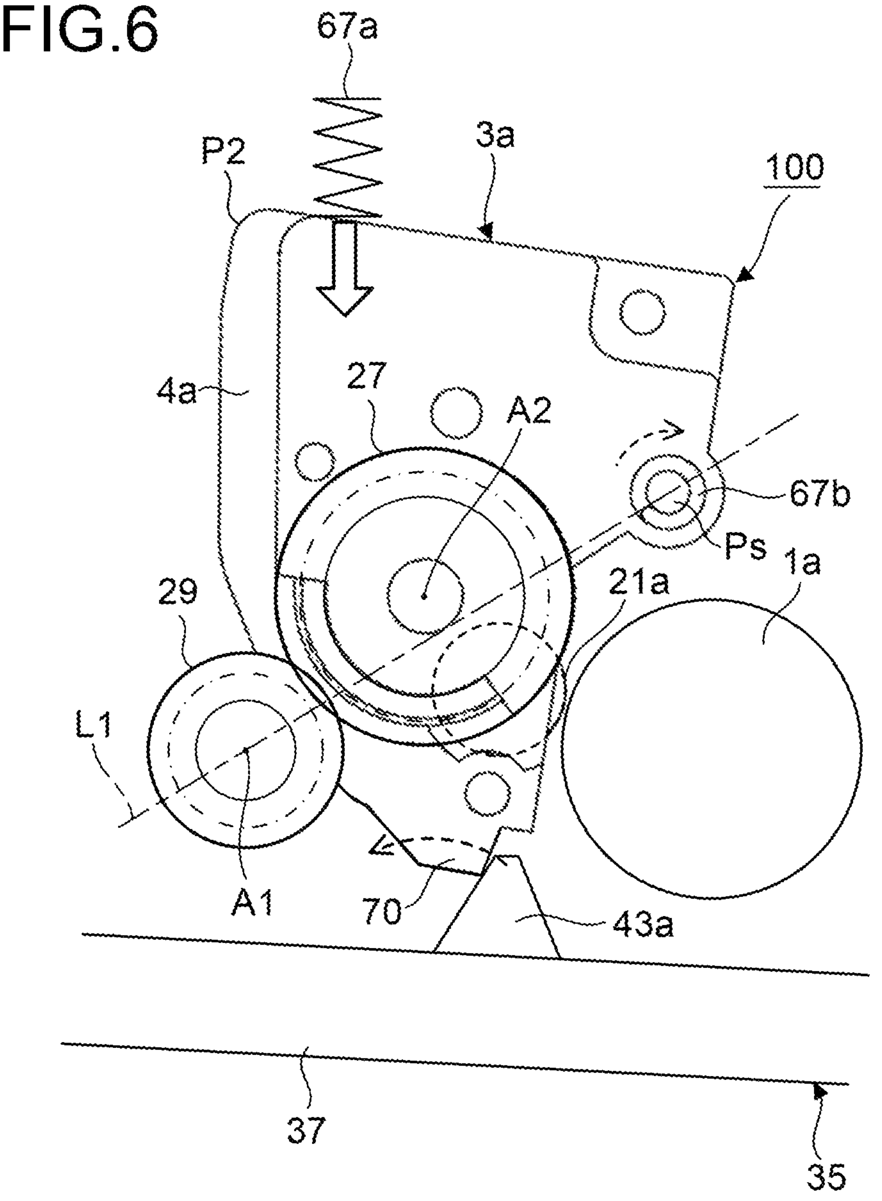
FIG. 6 is a side view of around the developing unit positioned in a first separate position.
Figure 7:
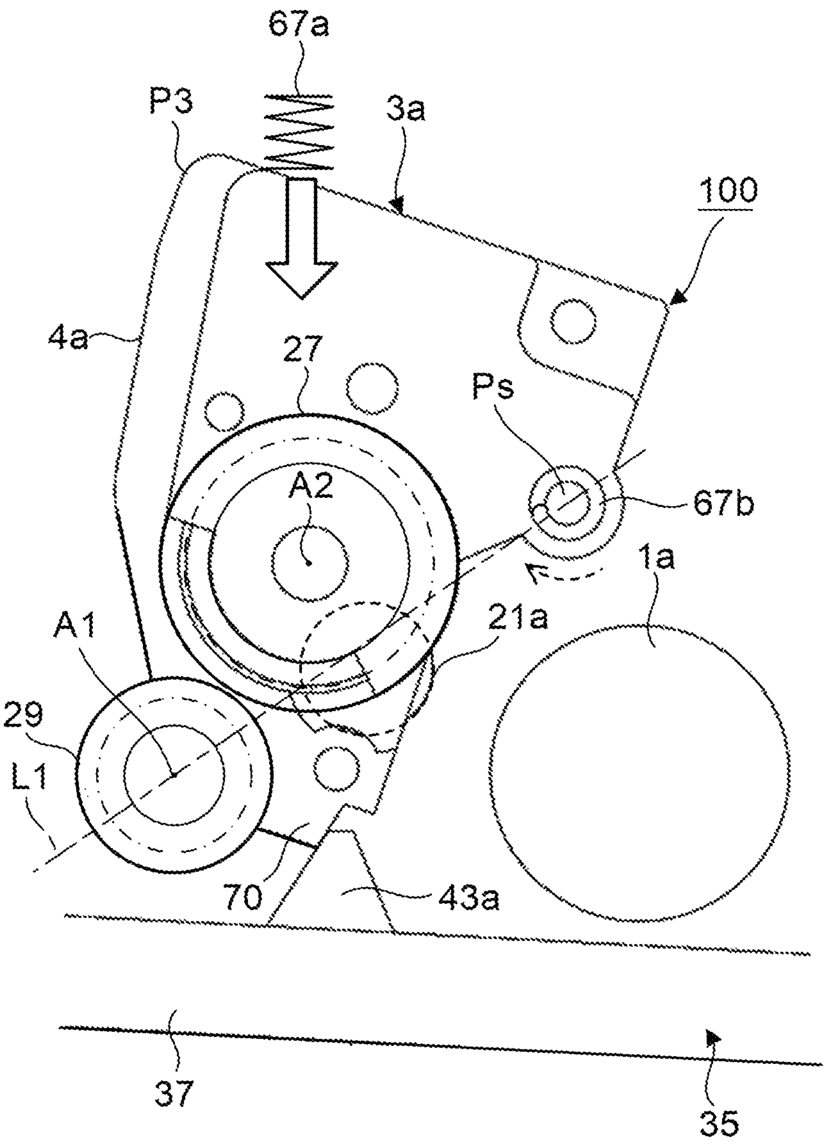
FIG. 7 is a side view of around the developing unit positioned in a second separate position.

FIG. 5 is a side view of around the developing unit 3*a* positioned in the contact position P1. FIG. 6 is a side view of around the developing unit 3*a* positioned in a first separate position P2. FIG. 7 is a side view of around the developing unit 3*a* positioned in a second separate position P3.

As shown in FIG. 2 and FIGS. 5 to 7, the developing unit 3*a* is supported so as to be swingable among the contact position P1, the first separate position P2 and the second separate position P3 along a circumferential direction centered on a swinging fulcrum Ps. The swinging fulcrum Ps is provided in the development container 4*a*. The swinging fulcrum Ps is positioned between a rotational axis A2 of the developing roller 21*a* and a rotational axis of the photosensitive drum 1*a* as viewed in a horizontal direction.

As shown in FIGS. 2 and 5, the contact position P1 is a position in which the outer circumferential surface of the developing roller 21*a* makes contact with an outer circumferential surface of the photosensitive drum 1*a*. While the developing unit 3*a* is in the contact position P1, toner is fed from the developing roller 21*a* to the photosensitive drum 1*a*.

As shown in FIGS. 6 and 7, the first separate position P2 and the second separate position P3 are positions in which the outer circumferential surface of the developing roller 21*a* is separate from the outer circumferential surface of the photosensitive drum 1*a*. The second separate position P3 is a position in which the developing unit 3*a* is farther from the photosensitive drum 1*a* than in the first separate position P2. A distance between the outer circumferential surface of the developing roller 21*a* and the outer circumferential surface of the photosensitive drum 1*a* in the developing unit 3*a* being in the second separate position P3 is larger than a distance between the outer circumferential surface of the developing roller 21*a* and the outer circumferential surface of the photosensitive drum 1*a* in the developing unit 3*a* being in the first separate position P2. Hereinafter, a swinging direction of the developing unit 3*a* from the contact position P1 side toward the second separate position P3 side will be referred to as 'separating direction'.

The foregoing swinging-and-biasing members 67*a*, 67*b* are coil springs which are elastically deformable in swinging directions of the developing unit 3*a*. The swinging-and-biasing member 67*a* is placed downstream of the development container 4*a* in the separating direction. The swinging-and-biasing member 67*a* is set into contact with an upper surface of the development container 4*a*. The swinging-and-biasing member 67*a* is positioned on one side of the developing roller 21*a* opposite to the other side on which the swinging fulcrum Ps is provided, as viewed in a horizontal direction. The swinging-and-biasing member 67*b* is wound circumferentially about the swinging fulcrum Ps serving as a center.

While the developing unit 3*a* is in the contact position P1, the swinging-and-biasing members 67*a*, 67*b* bias the developing unit 3*a* toward the photosensitive drum 1*a* in such a way that the developing roller 21*a* and the photosensitive drum 1*a* are preferably put into pressure contact with each other. As the developing unit 3*a* is swung from the contact position P1 toward the second separate position P3, the swinging-and-biasing member 67*a* is compressed, and the swinging-and-biasing member 67*b* is either compressed or expanded, to bias the developing unit 3*a* toward the contact position P1.

As shown in FIGS. 2 and 5, the developing unit 3*a* includes a drive transmission gear 27 in addition to the above-described component elements. The drive transmission gear 27 is supported by one end portion of the development container 4*a* as viewed in a direction along the rotational axis A2 of the developing roller 21*a*. The drive transmission gear 27 is coupled to the developing roller 21*a* so that rotation driving force inputted to the drive transmission gear 27 is transmitted to the developing roller 21*a*, causing the developing roller 21*a* to be rotated.

The development container 4*a* has a contact protrusion 70. The contact protrusion projects from a bottom portion of the development container 4*a* toward the first link member 37. The contact protrusion 70 is opposed to the projective portion 43*a* in a pivotal direction of the first link member 37. As the first link member 37 is pivoted, the projective portion 43*a* is pivoted upward, causing the contact protrusion 70 to be put into contact with the projective portion 43*a*.

A roller driving gear 29 (drive input gear) is placed on one side of the developing roller 21*a* opposed to the other side on which the photosensitive drum 1*a* is provided with the developing roller 21*a* interposed therebetween, as viewed in the horizontal direction. The roller driving gear 29 is rotatably supported by the apparatus body 7. The roller driving gear 29 is connected to a drive source (not shown) such as a motor, and rotated on reception of driving force by the driving source.

The roller driving gear 29 is engageable with the drive transmission gear 27. As shown in FIGS. 2, 5 and 6, while the developing unit 3*a* is in the contact position P1 or the first separate position P2, the roller driving gear 29 is engaged with the drive transmission gear 27. While the developing unit 3*a* is in process of swinging from the first separate position P2 to the second separate position P3, the roller driving gear 29 is separated from the drive transmission gear 27 (see FIG. 7).

While engaged with the drive transmission gear 27, the roller driving gear 29 inputs driving force of the driving source to the drive transmission gear 27. In this case, on condition that the drive transmission gear 27 and the roller driving gear 29 are engaged with each other (the developing unit 3*a* is in the contact position P1), driving force is transmitted to the developing roller 21*a* from the roller driving gear 29 via the drive transmission gear 27. The developing roller 21*a* is rotated by this driving force.

While the developing unit 3*a* is in the contact position P1 (in the state of FIGS. 2 and 5), the rotational axis A2 of the drive transmission gear 27 is positioned, as viewed in the separating direction, downstream of such a position as to overlap with a straight line L1 that connects the swinging fulcrum Ps and a rotational axis A1 of the roller driving gear 29 to each other.

Figure 8:
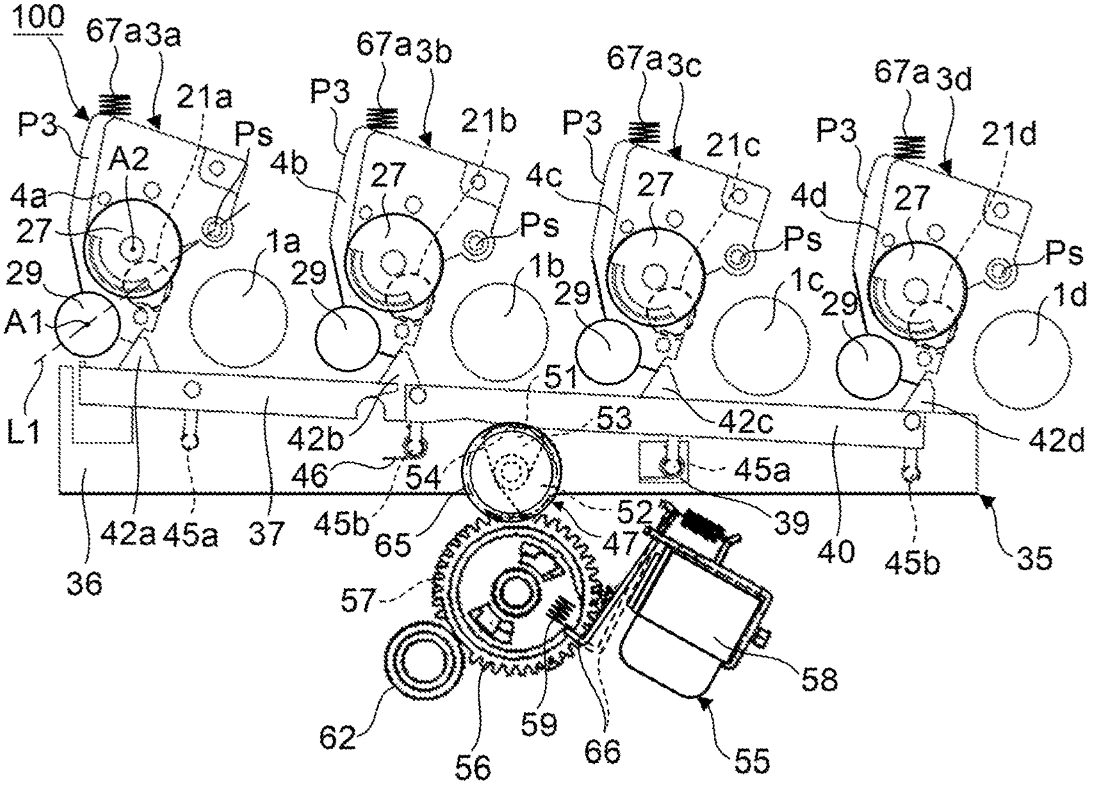
FIG. 8 is a side view of the developing units in a state in which all the developing units are positioned in the second separate positions.
Figure 9:
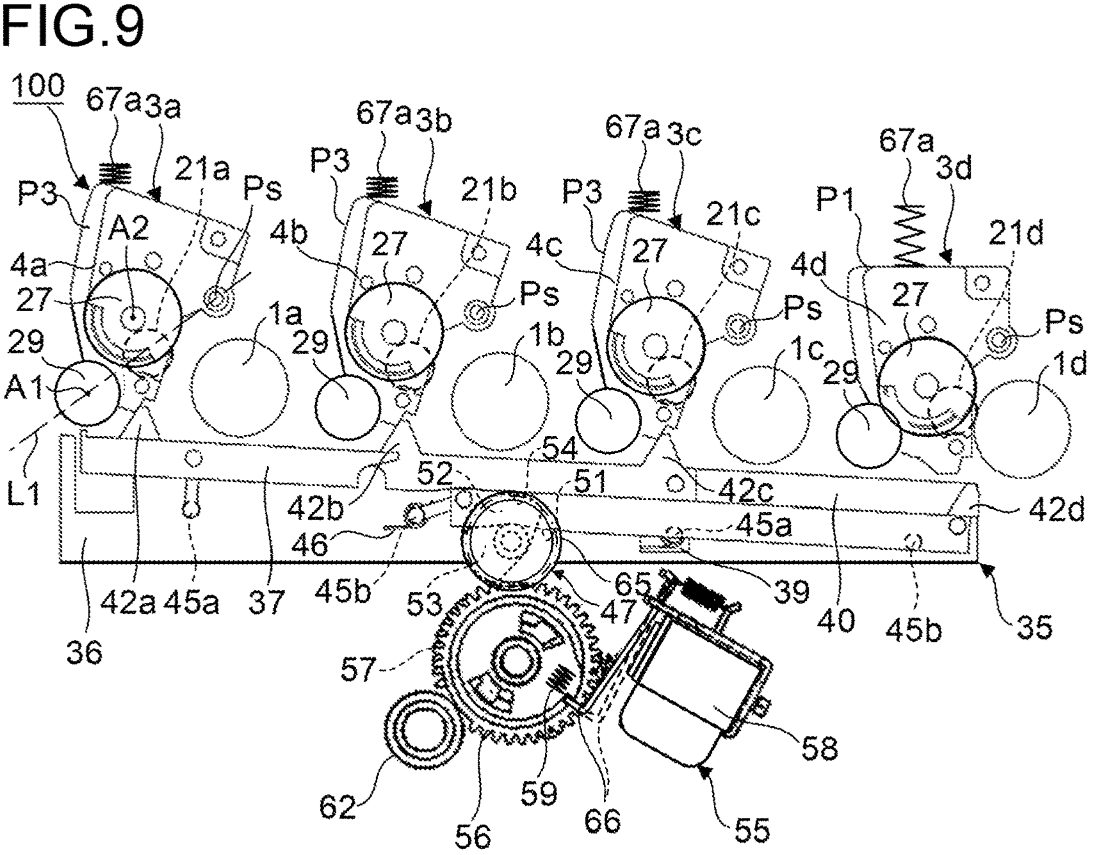
FIG. 9 is a side view of developing units positioned in the second separate positions, and a developing unit positioned in the contact position.

Next, swings of the developing units 3*a*-3*d* by the moving mechanism 35 are described in detail. FIG. 8 is a side view of the developing units in a state in which all the developing units 3*a*-3*d* are positioned in the second separate positions P3, respectively. FIG. 9 is a side view of the developing units 3*a*-3*d* in a state in which the developing units 3*a*-3*c* are positioned in the second separate positions P3, respectively, while the developing unit 3*d* alone is positioned in the contact position P1.

Reverting to FIG. 2, as described above, on condition that no rotation driving force has been inputted to the cam driving gear 65 (the cam driving gear 65 and the second gear 57 are not engaged with each other), the first link member 37 and the second link member 40 are separated from the developing units 3*a*-3*d* by biasing force of the first biasing member 39 and the second biasing member 46, causing all the developing units 3*a*-3*d* to be set to the contact positions P1, respectively (see FIG. 2).

In this state, when the second gear 57 and the cam driving gear 65 are engaged with each other, the first cam lobe 52 is put into sliding contact with the first working recess portion 51 while the second cam lobe 53 is put into sliding contact with the second working recess portion 54, as described above. Then, the first link member 37 and the second link member 40 are pushed up and swung, and the projective portions 43*a*-43*d* get closer to the contact protrusions 70 of the developing units 3*a*-3*d*, respectively.

In this state, as the first link member 37 and the second link member 40 are further swung, the projective portions 43*a*-43*d* are brought into contact with the contact protrusions respectively, pressing the same and causing the developing units 3*a*-3*d* to be swung from the contact positions P1 toward the first separate positions P2, respectively, against the biasing force of the swinging-and-biasing members 67*a*, 67*b* (see FIG. 6).

While the developing units 3*a*-3*d* are being moved from the contact positions P1 to the first separate positions P2, the developing rollers 21*a*-21*d* are separated from the photosensitive drums 1*a*-1*d*, respectively. Under a state that the developing units 3*a*-3*d* have reached the first separate positions P2, respectively, the roller driving gear 29 and the drive transmission gear 27 remain engaged with each other.

While the developing units 3*a*-3*d* are being moved from the first separate positions P2 toward the second separate positions P3, respectively, the drive transmission gear 27 is separated from the roller driving gear 29. Then, the developing roller 21*a* is stopped from rotation. As shown in FIG. 8, under a state that the developing units 3*a*-3*d* have reached the second separate positions P3, respectively, the first link member 37 and the second link member are positioned at their highest levels.

In this state, as the first cam member 48 and the second cam member 49 are further rotated, the second cam lobe 53 of the second cam member 49 is first separated from the second working recess portion 54. Then, the second link member 40 is pivoted downward so as to get farther from the developing unit 3*d* by the biasing force of the second biasing member 46.

In this connection, as described above, the working angle of the first cam member 48 is larger than that of the second cam member 49, and the downstream-side end edge of the first cam lobe 52 is positioned downstream of the downstream-side end edge of the second cam lobe 53 as viewed in the rotational direction of the first cam member 48. Therefore, at a time point when the second cam lobe 53 has been separated from the second working recess portion 54, the first cam lobe 52 and the first working recess portion 51 are in sliding contact with each other. Accordingly, the second link member 40 goes down ahead of the first link member 37. That is, in a case where the cam driving gear 65 is rotated with all the developing units 3*a*-3*d* positioned in the second separate positions P3, respectively (in the state shown in FIG. 8), the developing unit 3*d* (first developing unit) is first swung from the second separate position P3 to the contact position P1 as shown in FIG. 9, and subsequently the developing units 3*a*-3*c* (second developing units) are swung from the second separate positions P3 to the contact positions P1, respectively.

Because of this phase difference of swinging between the developing units 3*a*-3*c* and the developing unit 3*d*, the moving mechanism 35 is enabled to switch over among a full-color printing mode in which all the developing units 3*a*-3*d* are positioned in the contact positions P1, respectively (a state shown in FIG. 2), a retraction mode in which all the developing units 3*a*-3*d* are positioned in the second separate positions P3, respectively (a state shown in FIG. 8), and a monochromatic printing mode in which the developing units 3*a*-3*c* are positioned in the contact positions P1, respectively, while the developing unit 3*d* alone is positioned in the second separate position P3 (a state shown in FIG. 9). While the first cam member 48 and the second cam member 49 are being rotated, the foregoing modes are succeeded in a sequence of full-color printing mode, retraction mode, monochromatic printing mode, and again, full-color printing mode (following omitted).

Switchover of the modes is carried out in the following aspects. As already described, making one-time reciprocation of the iron core 66 of the solenoid 58 causes the first gear 56 and the second gear 57 to come to a stop after one-round rotation. Then, the second gear 57 and the cam driving gear 65 are engaged with each other during a specified period. During this period of engagement between the second gear 57 and the cam driving gear 65, the above-mentioned modes are advanced by one mode by virtue of arrangement of the gear teeth 63 of the second gear 57. As a consequence of this, the image forming apparatus 100 is enabled to control the swings of the developing units 3*a*-3*d* by controlling the number of times of reciprocation of the iron core 66 of the solenoid 58.

As described hereinabove, the developing units 3*a*-3*d* according to the image forming apparatus 100 of this embodiment are so configured that the drive transmission gear 27 is rotated in engagement with the roller driving gear 29 while the developing rollers 21*a*-21*d* are separate from the photosensitive drums 1*a*-1*d*, respectively. Therefore, it can be suppressed that the photosensitive drums 1*a*-1*d* may rub against the outer circumferential surfaces of the roller driving gears 29, respectively. Also, during an operation in which the moving mechanism 35 moves the developing units 3*a*-3*d* from the contact positions P1 to the second separate positions P3, respectively, the developing rollers 21*a*-21*d* are released from being driven. Therefore, it is no longer necessary to separately and individually provide a mechanism for stopping the drive of the roller driving gear 29 and another mechanism for separating the drive transmission gear 27 from the roller driving gear 29. Accordingly, it becomes possible to suppress complication of the apparatus structure and control lines. Thus, there can be provided an image forming apparatus 100 capable of suppressing developer deterioration and image deficiencies while suppressing increases in running cost and manufacturing cost.

Also as described above, with the developing unit 3*a* in the contact position P1, the rotational axis A2 of the drive transmission gear 27 is positioned, as viewed in the separating direction, downstream of such a position as to overlap with the straight line L1 that connects the swinging fulcrum Ps and the rotational axis A1 of the roller driving gear 29 to each other. As a consequence of this, the developing units 3*a*-3*d* are enabled to swing from the contact positions P1 toward the first separate positions P2, respectively.

Also as described above, the developing units 3*a*-3*d* are biased toward the contact positions P1, respectively, by the swinging-and-biasing members 67*a*, 67*b*. Therefore, with the developing units 3*a*-3*d* in the contact positions P1, the developing rollers 21*a*-21*d* are preferably set in contact with the photosensitive drums 1*a*-1*d*, respectively, so that downward movement of the first link member 37 and the second link member 40 causes the developing units 3*a*-3*d* to be automatically moved to the contact positions P1, respectively. As a consequence of this, the developing units 3*a*-3*d* can be made swingable each between the contact position P1 and the second separate position P3 with a relatively simple configuration.

Without being limited to the above-described embodiment, the present disclosure may be changed and modified in various ways unless those changes and modifications depart from the gist of the disclosure. For example, without being limited to color printers such as shown in FIG. 1, the disclosure may be applied to a wide variety of image forming apparatuses 100 including monochromatic printers, color/monochromatic multifunction peripherals, inkjet printers, facsimiles, and the like.

Also, the cam driving gear 65 in the above embodiment is implemented by adopting a configuration in which driving force is inputted by the drive mechanism 55 including the solenoid 58, the first gear 56 and the second gear 57. However, this is not limitative. It is also allowable to adopt, for example, a configuration in which the cam driving gear 65 is connected to a stepping motor rotatable only for a specified rotational angle. In this case, implementing output control of the stepping motor makes it possible to control the rotational angle of the cam driving gear 65 and moreover control the swings of the developing units 3*a*-3*d*. Thus, complication of the apparatus structure can be suppressed.

Furthermore, the driving source 68 of the drive mechanism 55 may be provided in common to the driving source of a motor for driving a conveyance roller pair or the like that conveys sheets as well as other motors. This is also applicable to the driving source connected to the roller driving gear 29.

Further, it is also allowable to provide a configuration in which the developing units 3_a_-3_d_ are biased only by either one of the swinging-and-biasing members 67_a_, 67_b_.

The present disclosure is applicable to image forming apparatuses including a developing unit that stops rotation of developing rollers during periods in which no image formation is performed. Utilizing this disclosure makes it possible to provide an image forming apparatus capable of suppressing developer deterioration and image deficiencies while suppressing increases in running cost and manufacturing cost.

What is claimed is:

1. An image forming apparatus comprising:

an image carrier in which an electrostatic latent image is to be formed on its outer circumferential surface and which is rotatably supported;

a developing unit including: a development container for internally containing a toner-containing developer; and a developer carrier which is rotatably supported by the development container and which carries the developer, the developing unit being supported so as to be swingable among: a contact position in which an outer circumferential surface of the developer carrier is in contact with the outer circumferential surface of the image carrier, allowing the toner to be fed to the outer circumferential surface of the image carrier; a first separate position in which the developer carrier is separate from the image carrier; and a second separate position in which the developer carrier is separate from the image carrier farther than in the first separate position;

a moving mechanism for reciprocating the developing unit between the contact position and the second separate position; and a drive input gear for inputting, to the developing unit, driving force for driving rotation of the developer carrier, wherein the developing unit includes a drive transmission gear for transmitting the driving force of the drive input gear to the developer carrier, while the developing unit is in the contact position or the first separate position, the drive transmission gear is engaged with the drive input gear; and while the developing unit is being moved from the first separate position to the second separate position, the drive transmission gear is separated from the drive input gear, the moving mechanism includes:

a link member which is supported so as to be reciprocatable in both a pressing direction for pressing the developing unit from the contact position toward the second separate position, and a retracting direction for getting farther from the developing unit;

a drive mechanism for reciprocating the link member; and a biasing member for biasing the developing unit toward the contact position, and as the link member is moved in the pressing direction, the developing unit is moved to the first separate position and to the second separate position against biasing force of the biasing member, as the link member is moved in the retracting direction, the developing unit is moved to the contact position by the biasing force of the biasing member, the developing unit is swung about a center which is a swinging fulcrum provided on one side of the drive transmission gear opposite to the other side on which the drive input gear is provided, with the drive transmission gear interposed therebetween, and while the developing unit is in the contact position, a center axis of the drive transmission gear is positioned, as viewed in a swinging direction of the developing unit directed toward the first separate position, downstream of a straight line that connects the swinging fulcrum and a center axis of the drive input gear to each other.

2. The image forming apparatus according to claim 1, wherein the link member includes a presser protrusion which is opposed to the developing unit in the pressing direction, and which, in a foregoing pressing state, is brought into contact with the developing unit to press the developing unit toward the second separate position.

3. The image forming apparatus according to claim 1, wherein the developing unit is provided in plurality along a moving direction of the link member, the link member is composed of a first link member and a second link member linearly juxtaposed to each other along the moving direction, the first link member presses, in the pressing state, is put into contact with a first developing unit, which is one of the plural developing units, so as to press the first developing unit toward the second separate position, and the second link member, in the pressing state, is put into contact with plural second developing units, which are a remainder of the plural developing units, so as to press the second developing units toward the second separate position.

4. The image forming apparatus according to claim 3, wherein the drive mechanism is enabled to switch over the first link member and the second link member among:

a first state in which the first developing unit is in the contact position and moreover the second developing units are in the first separate position or the second separate position;

a second state in which the first developing unit and each of the second developing units are in the first separate position or the second separate position; and a third state in which the first developing unit and the second developing units are in the contact positions, respectively.

* * * * *